Sept. 1, 1931.  H. J. MURPHY  1,821,230
LUBRICATING APPARATUS
Original Filed July 24, 1919
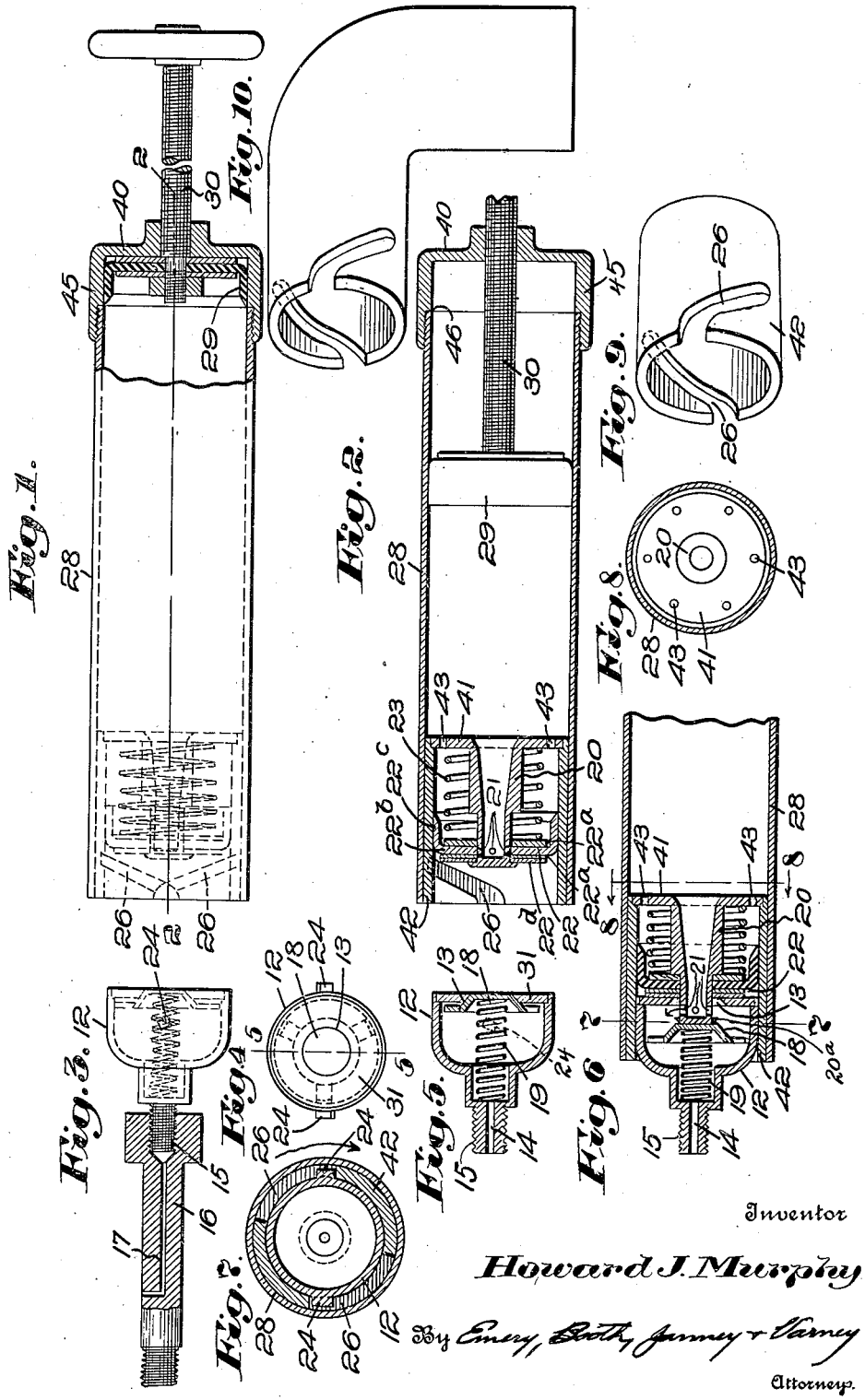
Inventor
Howard J. Murphy
By Emery, Booth, Janney & Varney
Attorney.

Patented Sept. 1, 1931

1,821,230

UNITED STATES PATENT OFFICE

HOWARD J. MURPHY, OF READING, MASSACHUSETTS, ASSIGNOR, BY MESNE ASSIGN-MENTS, TO ALEMITE CORPORATION, OF CHICAGO, ILLINOIS, A CORPORATION OF DELAWARE

LUBRICATING APPARATUS

Continuation of application Serial No. 313,087, filed July 24, 1919. This application filed July 31, 1920. Serial No. 400,314.

The chief object of this invention is to provide a grease gun adapted to cooperate with a grease cup, in such manner that the gun is adapted to be guided by and rotated on the external surface of the cup, and, when so guided and rotated, causes the opening of a gun valve controlling the grease outlet of the gun.

The invention also has for its object to provide certain improvements in the construction of the nozzle or outer end portion of the gun.

This application is a continuation of my application Serial No. 313,087, filed July 24th, 1919.

Of the accompanying drawings forming a part of this specification:—

Figure 1 is a side elevation, partly in section, of a grease gun embodying the invention;

Fig. 2 is a section on line 2—2 of Fig. 1, showing the piston advanced;

Fig. 3 is a side elevation of a grease cup, adapted to cooperate with the gun, and a view partly in section of a carrying part to which the cup is fixed;

Fig. 4 is an end view of the grease cup looking toward its outer end;

Fig. 5 is a section on line 5—5 of Fig. 4;

Fig. 6 shows in section the grease cup and a portion of the gun engaged therewith, the gun being in position to inject grease into the cup;

Fig. 7 is a section on line 7—7 of Fig. 6;

Fig. 8 is a section on line 8—8 of Fig. 6, looking toward the left;

Fig. 9 is a perspective view of the bushing hereinafter described; and

Fig. 10 shows a part adapted to fit the end of the gun and over a grease cup having its axis at an angle to the axis of the gun.

The same reference characters indicate the same parts in all of the figures.

12 represents a grease cup or lubricant-receiving nipple having a grease inlet 13 at its outer end, the opposite end of the cup being attachable to a carrying part and provided with a grease outlet 14, which is preferably formed in a threaded extension 15, adapted to be screwed into a tapped socket in a carrying part 16 to be lubricated. The carrying part as here shown is a bolt adapted to be inserted in a socket formed in an end of a vehicle spring, and provided with a grease duct 17 communicating with the periphery of the bolt.

The grease inlet 13 is circular and its margin is formed as a seat for a sealing part in the nozzle of the gun.

18 represents an inwardly displaceable valve within the cup, adapted to close the inlet 13, the valve and the seat formed by the inlet being preferably tapered, as shown by Figure 5.

The valve is adapted to be displaced inwardly into the cup, and is normally closed against its seat by a spring 19, as shown by Figure 5.

The valve 18 is displaceable by a tubular part 20, and the cup is provided with a cylindrical external surface adapted to guide and permit the rotation of the grease gun. On said external surface is an element of means for advancing the grease gun in such manner as to cause the tubular part 20 to displace the valve, as indicated by Figure 6.

The tubular part 20 is formed to enter the grease inlet 13, and is provided with lateral outlet ports 21 which are normally closed by a valve, indicated as a whole by the numeral 22, held yieldingly in the position shown by Figure 2, by a spring 23. The cup as shown here has a pair of oppositely projecting and oppositely inclined lugs 24, projecting from opposite sides of the cup and formed to cooperate with helical slots 26 formed in a tubular extension of the grease gun barrel 28, the arrangement being such that when the grease gun is moved endwise to engage its slots with the lugs 24, and then given a partial rotation, the gun is advanced endwise relatively to the fixed cup to the position shown by Figure 6, the tubular part 20 being thus caused to displace the valve 18, and enter the cup, so that its ports 21 communicate with the cup. The gun is now adapted to be operated by advancing its piston 29 by means of the screw-threaded piston-rod 30, engaged with a tapped socket in the outer head of the gun. This advancement of the piston forces grease through the nozzle and into the cup.

The cup is provided at its outer end with a displacing member, operable by the advancement of the grease gun to displace the annular valve 22 on the grease gun nozzle, and thus uncover the grease ports 21. Said end member as here shown, is an annular head 31 fixed to the cup and surrounding the grease inlet 13, said head being adapted to bear on the annular outer end of the valve 22.

It will now be seen that the cup is adapted to engage a portion of the grease gun, and to cooperate with said portion in causing an endwise advancement of the gun causing the simultaneous displacement of the cup valve 18 and of the nozzle valve 22. A backward rotation of the grease gun causes its disengagement from the cup and permits the closing of the cup valve 18 by its spring 19, and the closing of the nozzle valve 22 by its spring 23.

It is obvious that the lubricating material may be relatively hard grease, or a fluid oil, the described construction being particularly adapted for use with the grease.

The lugs 24 constitute the equivalent of quick pitch male screw threads adapted to cooperate, in advancing a grease gun, with the equivalent of female screw threads formed by helical slots 26 in a part of the gun, the arrangement being such that a partial rotation of the grease gun on its longitudinal axis imparts an endwise movement of sufficient amplitude to the gun. One lug 24 and one slot 26 may be employed instead of two.

The grease cup above described is set forth and claimed in Letters Patent No. 1,335,521, dated March 30, 1920.

The valve 22 is an annulus, the inner margin of which is in sliding contact with the tubular part 20, and is formed to cover the grease outlet formed by the ports 21. The outer margin of the valve is in sliding contact with the internal surface of the tubular extension of the grease gun barrel, so that the valve is guided both at its inner and outer margins.

The valve 22 is preferably composed of a plurality of washers, collectively constituting an annulus. As here shown, the valve includes two metallic washers 22a and an intermediate washer 22b of compressible material such as leather, clamped between the washers 22a and having a flange 22c in sliding contact with the barrel extension. A washer 22d of leather, or other compressible material, may be secured to the outer surface of the outer washer 22a to contact with the head 13 of the cup and form a tight joint therewith. The part 20 presents a circular flange 20a which extends over a portion of the front face of the compressible washer 22d and limits forward movement of the valve 22 by the pressure of the spring 23 and the pressure of the lubricant. This flange 20a also serves as a seat against the valve, when closed, and is urged under considerable pressure thereby presenting a seal which prevents escape of lubricant at this point. The diameter of this flange 22a is less than the smallest diameter of the inlet 13 of the lubricant-receiving cup and, therefore, when the connection between the nozzle and cup is completed, the annular head 31 of the cup presses back the valve and sealing part 22 providing a tight seal against the compressible washer 22d.

The barrel is provided with an outer head 40 and with an inner head 41, the inner head being within the barrel extension, and carrying the tubular part 20.

The barrel is preferably composed of a tubular body portion, which is longer than the path of the piston 29, and a tubular bushing 42, which is inserted in and rigidly secured to one end of the body portion. Said bushing contains the slots 26 and is fixed at one end to the inner head 41. The inner head may be provided with orifices 43 to permit grease to find its way into the space between the inner head and the valve 22 and to return to the piston-containing portion of the barrel. Thus grease is admitted behind the cup leather 22b, pressing against the rear face thereof and urging the sealing washer 22d under grease pressure into contact with the outer face of the lubricant-receiving cup or nipple 12. I have thus provided a lubricant-pressed sealing part which, when the nozzle and cup are being connected together, will provide a tight joint preventing leakage between the nozzle and nipple or cup. This tight joint is provided even before the opening of the valve and there is therefore no opportunity for leakage either during connection or after the parts are fully connected and lubricant is being discharged from the nozzle of the lubricant gun to the lubricant-receiving nipple or cup. Where, as in the preferred form of my invention illustrated, the lubricant-pressed sealing part is reciprocable, any pressure on the lubricant remaining in the barrel when disconnection between the gun and cup is effected will tend to cause the grease to follow up the sealing washer and maintain a tight joint until the valve is closed. In the absence of lubricant pressure behind the sealing part, the spring 23 provides sufficient pressure to insure a tight joint and the spring 23 at all times assists the pressure of the lubricant in maintaining a tight joint, this feature being particularly desirable where the gun is used for very fluid lubricant such as oil as distinguished from heavier greases.

Where, as in the preferred form of my invention illustrated in Figs. 1 through 9, the coupling nozzle is aligned with the axis of the barrel of the gun and the threads on the stem 30 and on the coupling between the nozzle and cup are of the same hand, all torque on the stem 30 is taken by the lubricant-receiving cup or nipple, which supports the barrel 28, rendering the apparatus operable by a single hand of the operator. In the apparatus illustrated, coupling, sealing and valve opening are all effected in the order named by torque on the handle or barrel of the gun, while torque on the handle of the gun tending to expel lubricant tends to increase the effectiveness of the seal between the nozzle and cup, not only by increasing the pressure of the lubricant, but by tending to twist the barrel and nozzle in coupling direction so that the projections or sectional threads 24 on the nipple (Fig. 4) will tend to ride up the female threads on the interior of the nozzle.

In Fig. 10, I have shown a part adapted to be used in making up a gun for use where the nozzle is at right angles of the axis of the barrel of the gun, in which case the valve mechanism ordinarily contained in the barrel or in alignment with the barrel will be contained in a cylindrical portion corresponding to the sleeve 42 but at right angles to the barrel, while the opposite end of the angled part may be soldered or otherwise properly secured within that portion of the barrel ordinarily occupied by the sleeve 42. In using this modification of my invention, coupling and uncoupling are effected by swinging the barrel in a plane passing through its axis and at right angles to the axis of the cup.

The outer head 40 is provided with an annular flange 45, having a shoulder 46 abutting against the outer end of the barrel, and an internally threaded portion projecting below said shoulder. The head 40 and the outer portion of the flange 45, above the shoulder 46, form a piston-receiving chamber outside the barrel. The piston is formed to be stored in said chamber when fully retracted as shown by Figure 1. When the piston is thus stored, the internally-threaded portion of the flange 45 may be engaged with the external thread of the barrel before the piston contacts with a charge of grease entirely filling the barrel. This engagement prevents radial displacement by the piston of any of the grease from the filling opening or mouth of the barrel and the soiling of the external surface of the barrel, during the operation of applying the outer head and the piston to the barrel.

It will be seen that as a result of the construction last described, the cylindrical internal surface of the piston-receiving portion or chamber is substantially flush with, or a continuation of, the internal surface barrel, so that when the piston is moved into the barrel from the position shown by Figure 1, the perimeter of the piston slides freely into the barrel without liability of being obstructed by the outer end of the barrel, which liability would exist if the cylindrical internal surface of the piston-receiving portion were offset outwardly from the internal surface of the barrel, in which case the outer end of the barrel would form an annular shoulder, liable to engage and arrest the piston, the latter being under compression and having a tendency to expand.

While I have shown and described a preferred form of one embodiment of my invention, it will be understood that changes involving omission, substitution, alteration and reversal of parts, and even changes in the mode of operation, may be made without departing from the scope of my invention, which is best defined in the following claims.

Claims.

1. In a lubricating system for injecting grease or oil under relatively high pressure into machine bearings through nipples associated with said bearings, the combination of a pressure grease gun having a lubricant delivery connection adapted to receive said nipples, a pressure retaining valve in said connection for preventing leakage of lubricant when the nipples are removed therefrom, means cooperating between said connection and said nipples whereby said connection may be attached to a nipple by relative rotation of the two to prevent separation of the same by relatively non-rotary movement under the pressure of the lubricant created by said pressure gun, and means cooperating between said valve and the nipple whereby when said connection is attached to the nipple said valve will be opened to permit the passage of lubricant into the nipple, and a lubricant pressed seal for the joint between the nipple and the connection.

2. In a lubricating system for injecting grease or oil under relatively high pressure into machine bearings through nipples associated with said bearings, the combination of a pressure grease gun having a lubricant delivery connection adapted to receive said nipples, a pressure retaining valve in said connection, means cooperating between said connection and said nipples whereby said connection may be attached to a nipple by relative rotation of the two to prevent separation of the same by relatively non-rotary movement under the pressure of the lubricant created by said pressure gun, means cooperating between the end of the nipple and the pressure retaining valve for opening the latter when the connection is attached to the nipple, a seal cooperating with the valve operating means to seal the joint between the lubricant receiving member and the connection when the valve is open, and check valves for retaining the lubricant in the nipples.

3. Lubricating apparatus for injecting grease or oil under relatively high pressure into machine bearings through nipples associated with said bearings comprising, in combination, a lubricant-expelling pressure grease gun having a valve and a coupling for attachment to the nipples to prevent separation thereof by direct axial movement under the pressure of the lubricant created by said gun at its discharge end, said coupling axially receiving said nipples and including interiorly thereof reciprocable means having a rearwardly extending flexible flange for receiving the pressure of the lubricant during expulsion of lubricant by said gun, said means providing a tight joint with the outer end of said nipple throughout the entire period when said valve is open during and after completion of the coupling operation and during the uncoupling operation.

4. In a pressure lubricating system for injecting grease or oil under relatively high pressure into machine bearings through nipples associated with said bearings, the combination of a lubricant-expelling pressure grease gun, said lubricant-expelling gun carrying at one end a generally aligned coupling for engagement with said nipples, said coupling having a valve and including a reciprocable spring and lubricant-pressed sealing washer for engagement with the outer face of said nipple, said gun rotatable relative to said nipples to produce movement of said gun toward said nipples thereby to couple it to a nipple and to provide a tight joint between said nipple and washer and for opening said valve.

5. In a lubricating system, a lubricant-receiving nipple, a gun having a barrel and piston, a handle at the rear of said barrel for moving said piston relative to said barrel to expel the contents of said barrel, a nozzle at the forward end of said barrel, said nozzle and nipple having means for coupling the two by bodily rotation of said barrel to prevent their separation by direct axial movement of said nipple relative to said coupling under the pressure of the lubricant created by rotation of said handle relative to said barrel, a lubricant escape port in said nozzle and means operable by the coupling operation for sealing the joint between said nozzle and nipple prior to completion of the coupling operation and for opening said port.

6. In a lubricating system for injecting grease or oil under relatively high pressure into machine bearings through nipples associated with said bearings, the combination of a pressure grease gun having a lubricant delivery connection adapted to receive said nipples, said connection comprising a coupling means for making a quickly detachable connection with said nipples by relative rotation of the two to prevent separation of the same by relatively non-rotary movement under the pressure of the lubricant created by said pressure gun, said connection having two relatively movable members constituting a valve for controlling the passage of lubricant through said connection, means for moving said members toward each other for opening said valve, and means for sealing the connection between said nipples and said connection before said valve is opened.

7. In a lubricating system for injecting grease or oil under relatively high pressure into machine bearings through nipples associated with said bearings, the combination of a pressure grease gun having a lubricant delivery connection adapted to receive said nipples, said connection comprising a coupling means for making a quickly detachable connection with said nipples by relative rotation of the two to prevent separation of the same by relatively non-rotary movement under the pressure of the lubricant created by said pressure gun, said connection having two relatively movable members, a valve for controlling the passage of lubricant through said connection, means for moving said members relatively to each other for opening said valve, and means for sealing the connection between said nipples and said connection before said valve is opened.

8. In a lubricating system for injecting grease or oil under relatively high pressure into machine bearings through nipples associated with said bearings, the combination of a pressure grease gun having a lubricant delivery connection adapted to receive said nipples, said connection having a coupling means for making a quickly detachable connection with said nipples by relative rotation of the two to prevent separation of the same by relatively non-rotary movement under the pressure of the lubricant created by said pressure gun, a normally closed valve for preventing passage of lubricant through said connection; and means for successively connecting said connection with said nipples, opening said valve, closing said valve, and disconnecting said connection from said nipples and a sealing means in said connection effective to seal the joint between said connection and nipples before said valve is opened.

9. In a pressure lubricating system, for injecting grease or oil under relatively high pressure into machine bearings through nipples associated with said bearings, said nipples each having a lubricant-receiving aperature at one end thereof and lateral projections, and a lubricant-expelling gun having a coupling at its discharge end for engagement with said nipples and providing a sealing part reciprocable relative to said gun for engagement with the outer face of a nipple, inclined means actuated by turning of said grease gun for pressing together said sealing part and the nipple to prevent leakage therebetween and a screw-threaded stem for actuating expulsion of lubricant from said gun by turning movement in the same direction which actuates pressing together of said sealing part and the nipple by said inclined means.

10. In a pressure lubricating system for injecting grease or oil under relatively high pressure into machine bearings through nipples associated with said bearings, a lubricant-expelling gun providing a nozzle adapted to receive the outer end of said nipples, said nipples and nozzle having co-operating cam means for translating rotary movement of said gun into reciprocatory movement thereof during passage of said nozzle over a nipple, a sealing part in said nozzle for providing a tight seal with said nipples, and a valve in said nozzle openable to admit lubricant to the nipple only pursuant to the provision of such tight seal.

11. A lubricant gun having a lubricant-containing barrel, lubricant-expelling means including a piston in said barrel and a threaded stem rotatable in a nut connected to said barrel for actuating lubricant-expelling movement of said piston, a coupling rigidly secured to said barrel, said coupling presenting steep pitch threads for engagement with projecting male means on a lubricant-receiving nipple, a reciprocable sealing part above said threads and for engagement with the outer face of the lubricant-receiving nipple, said reciprocable sealing part having a flexible peripheral flange extending toward said barrel and adapted to receive the pressure of the lubricant in said barrel, a port opened and closed in response to movement of said sealing part toward and from said barrel, said threaded stem and said steep pitch threads cooperating to effect coupling and lubricant expulsion by torque on said stem in one direction and said sealing part normally yieldingly pressed in a direction tending to effect closure of said valve and tending to provide a tight seal against the lubricant-receiving nipple when the valve is opened by said nipple.

12. Lubricating apparatus comprising, in combination, a lubricant-receiving nipple presenting peripherally extending male portions, a lubricant-expelling gun having a barrel, a coupling connected to said barrel at one end, a lubricant-expelling piston, and a threaded stem and handle projecting from the opposite end of said barrel, plural steep pitch threads in said coupling for engagement with said male portions, a valve in said nozzle, a lubricant-pressed sealing part in said nozzle for forming a tight seal against said lubricant-receiving nipple while permitting passage of lubricant thereto, coupling movement between said steep pitch threads and said male portions on said nipple, and also lubricant-expelling movement of said handle relative to said barrel being effected by torque on said handle in the same direction.

13. In a lubricating system for injecting grease or oil under relatively high pressure into machine bearings through nipples associated with said bearings, the combination of a compression grease gun for supplying lubricant to said nipples, said gun having a coupling member for connection to said nipples, said nipples and coupling member having co-acting means for connecting said nipples and coupling member upon an initial rotation of said coupling member relatively to said nipples, a valve controlling the flow of lubricant from said gun to said nipples, means for opening said valve upon continued rotation of said coupling member relatively to said lubricant receptacle, and means for sealing the joint between said coupling member and nipples prior to opening of said valve.

14. Lubricating apparatus comprising, in combination, a lubricant receiving nipple and lubricant supply means including a lubricant containing barrel, a lubricant expelling plunger reciprocable therein, a screw-threaded stem for actuating said plunger to expel the lubricant from said barrel when said stem is rotated in one direction, and a valved coupling rigidly connected to said barrel adjacent its discharge end, said valved coupling presenting connecting means for effecting a coupling with said nipple, a sealing part for effecting a tight seal with said nipple and a valve openable pursuant to the effecting of such tight seal between said sealing part and said nipple, the operation of said connecting means, of said sealing means and of said valve all actuated by rotation of said barrel in that direction in which said stem is rotated to expel lubricant from said barrel.

15. A lubricant gun presenting a barrel having a manually actuated plunger for expelling lubricant therefrom and having inflexibly connected thereto a valved coupling presenting a sealing part for effecting a tight seal with a lubricant receiving nipple, and valve means presenting a lubricant conducting passage openable by movement of said sealing part pursuant to provision of a tight seal between said sealing part and the lubricant receiving nipple.

16. A lubricant compressor of the class described including a discharge nozzle having a passage therethrough and adapted to form a quick detachable connection with a lubricant receiving nipple and comprising a reciprocable sealing member for making a seal with the lubricant receiving nipple, a valve normally closing the passage through said nozzle and having a reciprocable part, said reciprocable part operatively connected to said sealing member to open said valve only after slight movement of said member, and resilient means for closing said valve and urging said sealing member outwardly in said nozzle.

In testimony whereof, I have signed my name to this specification,

HOWARD J. MURPHY.